United States Patent [19]

Minns

[11] Patent Number: 5,492,987
[45] Date of Patent: Feb. 20, 1996

[54] PROCESS AND COMPOSITION FOR CLADDING OPTICAL FIBERS

[75] Inventor: Richard A. Minns, Arlington, Mass.

[73] Assignee: Polaroid Corporation, Cambridge, Mass.

[21] Appl. No.: 460,230

[22] Filed: Jun. 2, 1995

Related U.S. Application Data

[62] Division of Ser. No. 720,233, Jun. 24, 1991.

[51] Int. Cl.[6] .................... C08F 12/20; C08F 2/46
[52] U.S. Cl. .............. 526/245; 526/242; 522/35; 522/42
[58] Field of Search .................. 526/242, 245; 522/35, 42

[56] References Cited

U.S. PATENT DOCUMENTS

| | | | |
|---|---|---|---|
| 3,926,639 | 12/1975 | Rosen et al. | 96/115 R |
| 3,926,641 | 12/1975 | Rosen | 96/115 P |
| 3,929,490 | 12/1975 | Reiter et al. | 96/115 P |
| 3,969,119 | 7/1976 | Muzyczko et al. | 96/115 R |
| 4,008,138 | 2/1977 | Rosen et al. | 204/159.14 |
| 4,089,815 | 5/1978 | Reiter et al. | 260/2 R |
| 4,424,325 | 1/1984 | Tsunoda | 522/904 |
| 4,427,823 | 1/1984 | Inagaki et al. | 524/833 |
| 4,477,326 | 10/1984 | Lin | 204/159.13 |
| 4,479,984 | 10/1984 | Levy et al. | 427/54.1 |
| 4,508,916 | 4/1985 | Newell et al. | 556/420 |
| 4,511,209 | 4/1985 | Skutnik | 350/96.34 |
| 4,529,783 | 7/1985 | Tsunoda | 430/281 |
| 4,554,339 | 11/1985 | Hockemeyer et al. | 528/26 |
| 4,558,082 | 12/1985 | Eckberg | 524/104 |
| 4,568,566 | 2/1986 | Tolentino | 427/54.1 |
| 4,587,276 | 5/1986 | Lien et al. | 522/34 |
| 4,597,987 | 7/1986 | Hockemeyer et al. | 427/54.1 |
| 4,617,350 | 10/1986 | Maeda et al. | 525/133 |
| 4,663,185 | 5/1987 | Eckberg | 427/54.1 |
| 4,666,953 | 5/1987 | Klemiarczyk et al. | 522/34 |
| 4,672,079 | 6/1987 | Li Bassi et al. | 522/35 |
| 4,675,346 | 6/1987 | Lin et al. | 522/39 |
| 4,690,503 | 9/1987 | Janssen et al. | 350/96.3 |
| 4,815,079 | 3/1989 | Snitzer et al. | 372/6 |
| 4,914,004 | 4/1990 | Koehler et al. | 430/272 |
| 4,914,171 | 4/1990 | Zweig | 526/246 |
| 4,948,819 | 8/1990 | Green et al. | 522/31 |
| 4,973,611 | 11/1990 | Puder | 522/42 |
| 4,977,293 | 12/1990 | Hatton et al. | 558/153 |
| 5,022,737 | 6/1991 | Yamamoto | 522/182 |
| 5,024,507 | 6/1991 | Minns et al. | 430/286 |

OTHER PUBLICATIONS

Blyler and Aloisio, Polymer coatings for optical fibers, Chemtech, Nov. 1987, pp. 680–684.

Primary Examiner—Mark Chapman
Attorney, Agent, or Firm—David J. Cole

[57] ABSTRACT

In a process for cladding an optical fiber, a photoinitiator monomer having both a photoinitiating group and an ethylenically unsaturated group is reacted with a fluorosubstituted monomer having an ethylenically unsaturated group, thereby preparing a copolymer having pendant photoinitiating groups. This copolymer is then mixed with a fluorosubstituted diacrylate, thereby forming a photopolymerizable composition, which is coated on to the optical fiber and exposed to ultraviolet light, thereby curing the photopolymerizable composition to produce a cladding on the optical fiber. Preferred claddings can have refractive indices below 1.35.

10 Claims, 1 Drawing Sheet

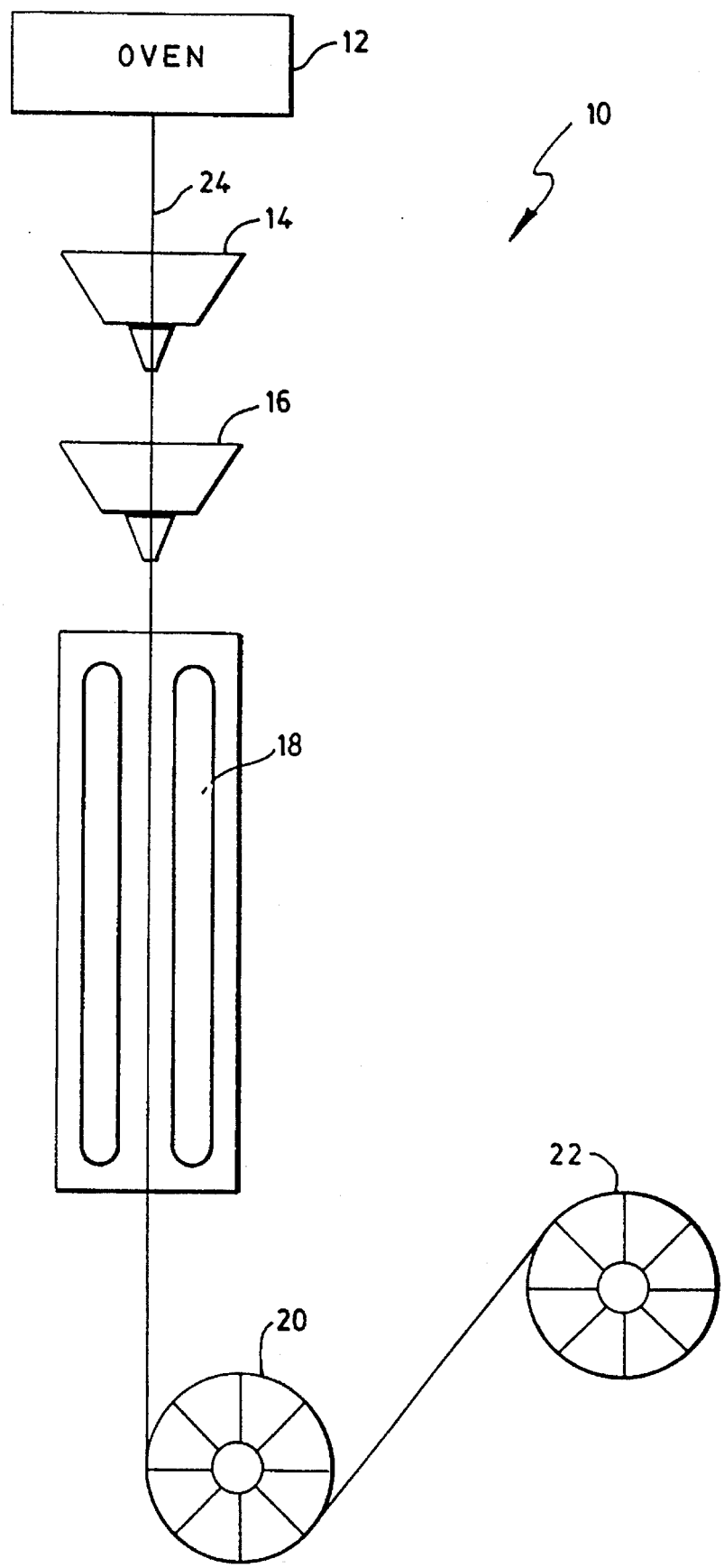

PROCESS AND COMPOSITION FOR CLADDING OPTICAL FIBERS

This is a division of application Ser. No. 07/720,233 filed Jun. 24, 1991, now allowed.

BACKGROUND OF THE INVENTION

This invention relates to a process and composition for cladding optical fibers.

As discussed in, for example, Blyler and Aloisio, Polymer coatings for optical fibers, Chemtech, November 1987, pages 680–684, optical fibers consist of a central core, usually a highly transparent glass (silica, often containing various doping materials) surrounded by a cladding with a refractive index lower than that of the glass; this cladding serves to confine light within the central core in order to reduce radiation losses from the surface of the core, and hence reduce attenuation of radiation travelling along the core.

In most optical fibers, the cladding is formed from a second glass. Because minor flaws in such a glass cladding greatly reduce the tensile strength of the optical fiber, it is customary to provide the fiber with a secondary, protective cladding, which is usually formed from a polymeric material. For example, U.S. Pat. No. 4,558,082 and U.S. Pat. No. 4,663,185 describe acrylated silicone polymers useful as, inter. alia, optical fiber claddings. These silicone polymers are prepared by reacting limonene oxide-functional silicones with acrylic acid or a substituted acrylic acid in the presence of a catalyst, which can be a tetraalkylurea or a tetraalkylguanidine.

Acrylic resins have also been used as protective claddings for optical fibers. U.S. Pat. No. 4,427,823 describes an uncured, filled coating composition comprising 100 parts by weight of (a) a polyfunctional acrylic-type carboxylic acid ester monomer or its prepolymer, this monomer or prepolymer being composed of 0 to 75 percent by weight tri- or higher acrylates, and 25 to 100 percent diacrylate; (b) 0.001 to 20 parts by weight of a polymerization initiator; and (c) 5 to 250 parts by weight of an inorganic solid filler having a refractive index of 1.40 to 1.60 and an average first-order particle diameter of at least 1 μ but less than 1 μ.

U.S. Pat. No. 4,479,984 describes multifilament bundles (which can be optical fiber bundles) impregnated with an ultraviolet curable resin to form a composite material suitable for use as a strength member. Among the resins which can be used in such bundles are various acrylate resins.

U.S. Pat. No. 4,690,503 describes a glass optical fiber having a primary coating constructed of two layers of ultraviolet cured acrylate resin. The first, inner layer has a modulus of elasticity at 25° C. less than or equal to 5 N/mm$^2$, while the second, outer layer has a modulus of elasticity at 25° C. of from 25 to 1500 N/mm$^2$, the ratio of the thickness of the first layer to the thickness of the second layer being between 0.5 and 2.

In some cases it is possible to form the primary cladding of the Optical fiber (i.e., the cladding immediately adjacent the core) from a polymeric material. According to the aforementioned Blyler and Aloisio article, polymer-clad fibers usually consist of a silica core clad with either a poly(dimethylsiloxane) resin or a fluorinated acrylic polymer. For example, U.S. Pat. No. 4,568,566 describes photocurable silicone compositions, useful as optical fiber claddings, which compositions contain chemically combined siloxy units and units of the formula $R_2SiO$, where a number of the R units are acrylate or alkyl-substituted acrylate ester groupings.

U.S. Pat. No. 4,554,339 and U.S. Pat. No. 4,597,987 describe organopolysiloxanes having a viscosity of 100 mPa at 25° C. and having both SiC-bonded acryloxyalkyl groups and Si-bonded hydrogen atoms in the same molecule. These organopolysiloxanes are prepared by adding an allyl alcohol to a diorganopolysiloxane containing a terminal Si-bonded hydrogen atom, then esterifying the hydroxyl groups of the resultant reaction product with acrylic acid and subsequently equilibriating the resultant diorganopolysiloxane with an organo(poly)siloxane containing an Si-bonded hydroxyl group in each of the terminal units. The final organopolysiloxane is stated to be useful as, inter alia, an optical fiber cladding.

However, silicone primary claddings have a number of serious disadvantages. The viscosity and curing requirements of the silicones restrict the production rate of the clad fiber to about 0.5 meters/sec. Silicone claddings do not adhere well to quartz, and the softness of the cladding leads to difficulties in connecting the clad fiber to other components of the optical system; temperature changes can cause the quartz core to be forced into and out of the cladding at the connection. Furthermore, according to U.S. Pat. No. 4,511,209, exposing the silicone-clad optical fibers to low temperatures in the range of –40° to –50° C. results in an increase in attenuation of 10–20 dB/km; in many cases an increase in room temperature attenuation occurs after the fiber has been exposed to such low temperatures.

It is also known that fluorine-containing materials can be incorporated into claddings containing acrylates and methacrylates. For example, U.S. Pat. No. 4,508,916 describes curable substituted urethane acrylates and methacrylates having an aliphatic backbone with at least one pendant fluorinated organic group attached thereto, this backbone being end-capped with an acrylic or methacrylic group.

U.S. Pat. No. 4,617,350 describes a thermoplastic resin useful for optical purposes, including optical fiber claddings, and obtained by blending a polymer of an acrylic esters with a copolymer of vinylidene fluoride and hexafluoroacetone. The refractive index of the blend is in the range of 1.37 to 1.48.

U.S. Pat. No. 4,914,171 describes a difunctional epoxy acrylate monomer prepared by reacting a highly fluorinated diglycidyl ether with an excess of acrylic acid in the presence of a catalyst. The patent states that clear, colorless, low refractive index polymers can be prepared by polymerization of this monomer or blends with other acrylates to give products useful as low surface energy coatings, and low refractive index coatings.

Copending application Ser. No. 07/521,671, filed May 10, 1990 and assigned to the same assignee as the present application (now U.S. Pat. No. 5,024,507) describes and claims a photopolymerizable composition capable of being polymerized upon exposure to ultraviolet light, the composition forming upon photocuring a cured composition having a refractive index not greater than about 1.43, and comprising a substantially homogeneous mixture of:

a) an unsubstituted or fluorosubstituted diacrylate monomer;

b) a fluorinated monofunctional acrylate monomer in an amount of from about 2 to about 12 parts by weight per part by weight of the diacrylate monomer;

c) a photoinitiator; and d) a viscosity modifying agent in an amount sufficient to increase the viscosity of the composition to a value in the range of from about 1000 to about 15000 cP.

Example 4 of this application shows the production, from a preferred photopolymerizable composition, of a cured polymer having a refractive index of 1.378.

Although the claddings described in this copending application are satisfactory for many purposes, there are certain applications, for example, coupling the output of a laser diode to an optical fiber, where a cladding with an even lower refractive index is desirable in order to provide an optic fiber with a higher numerical aperture and coupling efficiency. However, the present inventor has found that if one attempts to produce a very low refractive index cladding using the compositions described in this copending application by employing a highly fluorinated diacrylate monomer, a highly fluorinated monoacrylate monomer and, as the viscosity modifying agent a homopolymer of a highly fluorinated monoacrylate, unsatisfactory results are obtained. Firstly, during polymerization of a Solution of the viscosity modifying agent in the monomer mixture, substantial haze develops, apparently because of phase separation between the polymer being produced and the viscosity modifying agent. Secondly, most available photoinitiators are insoluble in the mixture of highly fluorinated acrylate monomers, and even diethoxyacetophenone, which is somewhat soluble in the monomer mixture, becomes incompatible and gives very hazy mixtures in the presence of the viscosity modifying agent.

It has now been discovered that the aforementioned problems can be eliminated, or at least substantially reduced, by first reacting a photoinitiator monomer having both a photoinitiating group and an ethylenically unsaturated group with a fluorosubstituted monomer having an ethylenically unsaturated to form a copolymer having pendant photoinitiating groups, and then using this copolymer as a combined viscosity modifying agent and photoinitiator in a photopolymerizable composition.

SUMMARY OF THE INVENTION

Accordingly, this invention provides a photopolymerizable composition capable of being polymerized upon exposure to ultraviolet light, the composition comprising:
 a copolymer having pendant photoinitiating groups, this copolymer having repeating units from a photoinitiator monomer having both a photoinitiating group and an ethylenically unsaturated group, and repeating units from a fluorosubstituted monomer having an ethylenically unsaturated group; and
 a fluorosubstituted diacrylate.

This invention also provides a process for the preparation of a copolymer having pendant photoinitiating groups, this process comprising reacting a photoinitiator monomer having both a photoinitiating group and an ethylenically unsaturated group with a fluorosubstituted monomer having an ethylenically unsaturated group.

This invention also provides a process for cladding an optical fiber, which process comprises:
 providing a photopolymerizable composition comprising a copolymer having pendant photoinitiating groups, this copolymer having repeating units from a photoinitiator monomer having both a photoinitiating group and an ethylenically unsaturated group, and repeating units from a fluorosubstituted monomer having an ethylenically unsaturated group; and a fluorosubstituted diacrylate;
 coating the optical fiber with a layer of the photopolymerizable composition; and
 exposing the coated optical fiber to ultraviolet light, thereby curing the photopolymerizable composition to produce a cladding on the optical fiber.

Finally, this invention provides a copolymer having pendant photoinitiating groups, this copolymer having repeating units from a photoinitiator monomer having both a photoinitiating group and an ethylenically unsaturated group, and repeating units from a fluorosubstituted monomer having an ethylenically unsaturated group.

BRIEF DESCRIPTION OF THE DRAWING

The accompanying drawing shows schematically an apparatus which can be used to carry out the process of the invention for cladding an optic fiber.

DETAILED DESCRIPTION OF THE INVENTION

As already mentioned, in the process of the present invention a photoinitiator monomer having both a photoinitiating group and an ethylenically unsaturated group is reacted with a fluorosubstituted monomer having an ethylenically unsaturated group to produce a copolymer having pendant photoinitiating groups. This copolymer is then mixed with a fluorosubstituted diacrylate to form a photopolymerizable composition, which can be coated onto an optical fiber and cured by exposure to ultraviolet light, thereby forming a cladding on the fiber.

The fluorosubstituted monomer used to form the copolymer of the present invention is preferably a monoacrylate or mono-methacrylate, the monoacrylates generally being preferred over the methacrylates because of their lower refractive indices. Desirably, the monoacrylate is one in which a minimum of three C—F bonds exist and in which at least 25 percent of the C—H bonds in the corresponding unsubstituted monomer have been replaced with C—F bonds. Desirably, the monomer will contain from about 30 to about 65 percent by weight of fluorine. Among the monoacrylates which may be used are, for example, those of the formula:

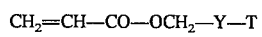

where Y is a perfluoroalkylene grouping and T is fluorine or a —CF$_2$H group. The fluorinated monoacrylate may also contain heteroatoms such as sulfur, oxygen and nitrogen; examples of such monomers are those of the formula:

where Z is H(CF$_2$)$_m$ or F(CF$_2$)$_m$, where m is an integer from 3 to 12, R is an alkyl group and A is hydrogen or methyl. Examples of commercially available monoacrylates which may be useful in the present process are 1H,1H,5H-octafluoropentyl acrylate, trifluoroethyl acrylate and heptafluorobutyl acrylate, all of which are available from PCR Incorporated, P.O. Box 1466, Gainesville, Fla. 32602, and

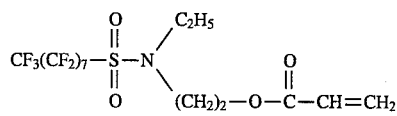

which is available from Minnesota Mining and Manufacturing Company, St. Paul, Minn. under the tradename FX-13. Desirably, the fluorosubstituted monoacrylate comprises a fluorosubstituted polyether, an especially preferred polyether being that of the formula:

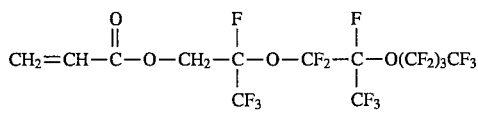

which is available from Minnesota Mining and Manufacturing Company under the tradename L-9911.

The ethylenically unsaturated group of the photoinitiator monomer used in the present invention is preferably an acrylate or methacrylate group. Preferred (meth)acrylates are (meth)acrylates of a phenoxyalkanol or a phenylalkanol; a specific preferred photoinitiator is that of the formula:

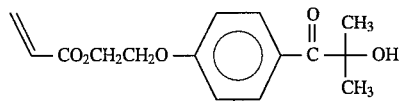

which is sold by EM Industries, Inc, 5 Skyline Drive, Hawthorne, N.Y. 10532 under the tradename Darocur ZLI-3331.

The copolymerization of the photoinitiator monomer and the fluorinated monomer should of course be carried out so that only the ethylenically unsaturated groups of the two monomers react, and essentially no reaction of the photoinitiator groups of the photoinitiator monomer occurs. Catalysts capable of causing the reaction of ethylenically unsaturated groups without causing reaction of photoinitiator groups are of course well-known to those skilled in the polymer art, and are commercially available. One specific catalyst which has been found to give good results in the present process is azobis(isobutyronitrile) (AIBN). The mixture of the photoinitiator monomer and the fluorinated monomer, and the resultant copolymer, should of course be screened from radiation (typically ultraviolet radiation) liable to cause reaction of the photoinitiator groups until the photopolymerizable composition has been applied to the optical fiber.

The optimum molar ratio of photoinitiator monomer to fluorinated monomer may readily be determined empirically; this molar ratio affects the degree of cross-linking in the final cladding, and hence the physical properties of that cladding. Typically, from about 0.02 to about 0.2 moles of photoinitiator monomer will be used per mole of fluorinated monomer. The copolymerization of the photoinitiator monomer and the fluorinated monomer is conveniently effected in a fluorinated solvent; both ethyl trifluoroacetate and 1,3-bis(trifluoromethyl)benzene (hexafluoro-m-xylene, or HFX) may be used as solvents, although the latter is preferred since the former may be toxic due to its ready hydrolysis to trifluoroacetic acid.

The fluorosubstituted diacrylate used in the present process desirably contains at least about 25 percent, and preferably from about 25 to about 65 percent by weight fluorine. A preferred group of fluorosubstituted diacrylates are those of the formulae:

$$CH_2=CH-CO-OCH_2-X-CH_2-O-CO-CH=CH_2$$

and $$X'-SO_2N(CH_2CH_2-O-CO-CH=CH_2)_2$$

where X is a perfluoroalkylene grouping, or a perfluoroalkylene grouping in which one or more carbon atoms have been replaced by —O— linkages, and X' is a perfluoroalkyl group. Examples of such diacrylates are:

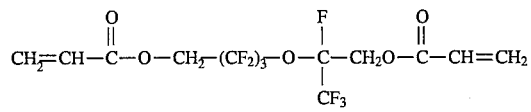

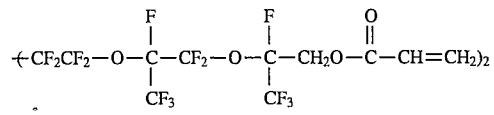

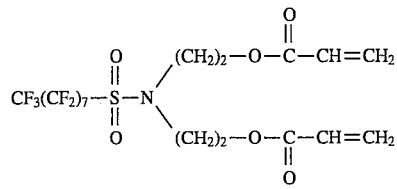

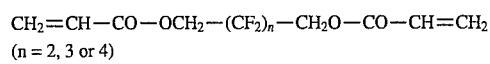

(n = 2, 3 or 4)

Diols suitable for preparing these diacrylates are available from Minnesota Mining and Manufacturing Company, St. Paul, Minn. A specific preferred diacrylate for use in the present process is that of the formula:

$$CH_2=CH-CO-OCH_2CF_2O(CF_2CF_2O)_m(CF_2O)_n-CF_2-CH_2O-CO-CH=CH_2,$$

which is sold by Minnesota Mining and Manufacturing Company under the tradename L-9367.

The relative amounts of the copolymer and the fluorinated diacrylate in the photopolymerizable composition affect both the viscosity of the composition and the physical properties of the cladding produced. In general, it is desirable that the viscosity of the photopolymerizable composition be in the range of about 1000 to about 15000 cP, since viscosities within this range are desirable to allow proper coating of optical fibers using conventional coating equipment. Photopolymerizable compositions comprising from about 0.5 to about 2 parts by weight of the copolymer per part by weight of the fluorosubstituted diacrylate monomer are preferred, since such compositions normally have a viscosity appropriate for coating and produce claddings with good physical properties.

The present invention can produce claddings with refractive indices less than about 1.35; indeed, as described in the Examples below, preferred processes of the present invention can produce claddings with refractive indices as low as 1.33.

Cladding of optical fibers by the process of the present invention may be effected using any of the conventional techniques known to those skilled in the art. In a preferred process, coating of an optical fiber with the photopolymerizable composition of the present invention is effected using the apparatus shown schematically in the accompanying drawing. This apparatus, generally designated 10, comprises an oven 12 containing a glass preform. Beneath the oven 12 are disposed two coating cups 14 and 16, each containing the photopolymerizable composition. An ultraviolet lamp 18 (for example, a Fusion Research electrodeless ultraviolet mercury vapor lamp) is disposed below the coating cup 16, and a capstan 20 is disposed below the lamp 18. The apparatus further comprises a wind-up roll 22.

An optical fiber 24 is drawn from the oven 12 at a rate of approximately 0.5 m/sec. by the capstan 20, and passes through the coating cups 14 and 16. These cups are provided with downwardly-tapering conical bases, with the apex of each cone having a vertical bore passing therethrough, the diameter of this bore being equal to the desired diameter of the optical fiber coated with the photopolymerizable composition, so that the bore wipes excess photopolymerizable composition from the fiber. The fiber, with the uncured photopolymerizable composition thereon, is then traversed past the lamp 18, where the solution is cured to produce an adherent clear cladding on the optical fiber.

If desired, before being wound onto the roll 22, the clad fiber may be passed through additional coating cups and under an additional ultraviolet lamp to apply an overcladding in order to protect the relatively soft cladding of the invention from blocking on the roll 22.

The compositions of the present invention may be used for cladding any optical fibers. They may, for example, be used for cladding the fibers of optical fiber lasers, such as those described in U.S. Pat. No. 4,815,079, issued Mar. 21, 1989 to Snitzer et al. The fiber optic lasers described in this patent comprise a single-mode core disposed within a relatively large, multimode cladding such that the core is displaced from the center of the cross-section of the cladding. The cladding is surrounded by a further layer (second cladding) to prevent radiation from propagating out of the cladding. The compositions of the present invention may be used to form the second cladding of such a optical fiber laser, and permit the refractive index of this cladding to be such as to produce a numerical aperture (given by:

$$N.A. = (N_1^2 - N_2^2)^{1/2}.$$

where $N_1$ is the refractive index of the first cladding and $N_2$ that of the second cladding) for the optical fiber greater than 0.4 in such an optical fiber laser.

From the foregoing, it will be seen that the processes of the present invention enable very low index claddings to be produced on optical fibers without the development of haze or phase separation during the preparation of the photopolymerizable composition or the curing of that composition to form the cladding itself. Furthermore, application of the photopolymerizable compositions of the present invention to the optical fibers, and curing of the composition, can be achieved using conventional equipment.

The following Examples are now given, though by way of illustration only, to show details of preferred reagents, conditions and techniques used in the present invention.

EXAMPLES

EXAMPLE 1

Preparation of Copolymer having Pendant Photoinitiating Groups

This Example illustrates the preparation of a copolymer having pendant photoinitiating groups by reaction of a photoinitiator monomer having both a photoinitiating group and an acrylate group with a fluorosubstituted monoacrylate.

Darocur ZLI-3331 (6.0 g, formula and manufacturer given above) was purified by dissolving it in dichloromethane (10 mL), and the resultant solution was purified by flash chromatography on a silica gel (32–63 μm) column with 3% diethyl ether in dichloromethane as the eluent, 50 mL fractions being collected. Fractions 15–45, which contained the pure product, were combined and the solvents removed on a rotary evaporator at room temperature. The resultant residue was dissolved in a dichloromethane/pentane mixture, and the solvents again removed on a rotary evaporator at room temperature; when most of the solvents had been removed, crystallization commenced, and a moderately high oil pump vacuum was applied to complete the crystallization. The resultant cream-colored solid was broken up, transferred to an amber glass jar to protect it from ultraviolet radiation, and dried to constant weight under vacuum at room temperature to yield 5.22 g. (87%) of a material melting at 55°–56° C.

L-9911 (360 g, formula and manufacturer given above) was purified by fractional distillation from a 250 mL, three-necked, round-bottomed flask equipped with a magnetic stirrer, thermometer, 30 cm Vigreux column and a variable reflux ratio still head connected to a vacuum pump via a manometer and a liquid nitrogen cooled trap. Di-tert-butylhydroquinone was added to the flask as a polymerization inhibitor. The pressure was maintained at 5 mm Hg and the flask heated on an oil bath held at 95°–121° C. The fraction distilling at 55°–57° C. at the column head was collected (158.5 g, 44%) and used in the preparation described below. This fraction was found to lack the infrared peaks at 3500 cm$^{-1}$ (due to unreacted alcohol) and 1810 cm$^{-1}$ (due to trifluoroacetate impurities) present in the starting material.

Purified Darocur ZLI-3331 (4.0 g) was dissolved in warm HFX (50 mL, previously purified by distillation through a Vigreux column) with swirling, and a small amount of insoluble polymer removed by filtration through cotton wool. The clear, filtered solution was added under argon to a 250 mL, three-necked, round-bottomed flask equipped with a magnetic stirrer, thermometer and condenser. Purified L-9911 (96 g) was slowly poured into the flask with stirring, then additional HFX (50 mL) was added. Finally azobis(isobutyronitrile) (100 mg) was added and the solution was stirred with the flask in an oil bath held at 60° C. Deoxygenation was effected by alternately evacuating the flask until HFX began to reflux, and then filling the flask with argon back to atmospheric pressure, this cycle being repeated five times.

After the reaction mixture had been stirred for 25 hours, the resultant viscous solution was transferred by pipette into acetone (600 mL, reagent grade) in a 1 L Erlenmeyer flask. The resultant acetone solution was decanted from the polymer gum, the gum washed with acetone, and the acetone again decanted. A fluorocarbon solvent (100 mL of Fluorinert FC-72, sold by Minnesota Mining and Manufacturing Company; this material is mainly $C_6F_{14}$ and has a boiling point of about 56° C.) was added and the resultant white mixture transferred to a 250 mL round-bottomed flask. Acetone and FC-72 were distilled from the flask under vacuum at room temperature using a rotary evaporator, and the two immiscible solvents recovered were separated. The Erlenmeyer flask was washed with the recovered FC-72, the washings were added to the polymer in the flask, and the resultant mixture was again distilled on the rotary evaporator, with the recycling of the FC-72 being repeated until no more acetone distilled and the polymer solution was clear. A final distillation of FC-72 from the polymer was effected at 25° C. under 2 mm Hg pressure by attaching an oil pump to the rotary evaporator, and the polymer was then stored in vacuo at room temperature in the dark until a constant weight was obtained.

The copolymer thus prepared (87.3 g, 87% yield) was a clear, pale yellow, very viscous oil of refractive index ($n_D^{25}$) 1.3435. The copolymer (51.9 mg) was dissolved in 1,1,2-trichlorotrifluoroethane to a total volume of 10.0 mL and its inherent viscosity (inh) measured by a Cannon-Ubbelholde Dilution Viscometer size 50 found to be 0.08 dL/g. The copolymer was insoluble in trifluorotoluene ($C_6H_5CF_3$) and trifluoroethyl acetate ($CH_3CO_2CH_2CF_3$).

EXAMPLE 2

Preparation and Curing of Resin Suitable for Optical Fiber Cladding

This Example illustrates the preparation and curing of a resin suitable for use as an optical fiber cladding.

L-9367 (approximately 450 g) was purified by filtration through silica gel. Purified L-9367 thus prepared (87.3 g) was added to the copolymer (87.3 g) prepared in Example 1 above in a 250 mL round-bottomed flask. The resultant mixture was warmed on a steam bath, with manual rotation of the flask and magnetic stirring of the contents, to produce a clear, haze-free, pale yellow, viscous, homogeneous solution, which was transferred to a brown glass bottle while still warm. The net weight of the transferred solution was 171.7 g (98%), and its Brookfield viscosity was 3850 cP.

To demonstrate curing of this solution, a small quantity thereof was placed between two glass microscope slides (25×75 mm) separated by two thicknesses (approximately 0.25 mm) of Parafilm (sold by American Can Company, Greenwich Conn. 06830). The refractive index ($n_D^{23}$), as measured by an Abbe refractometer with a drop of mineral oil between the refractometer prism and the slide sandwich, was 1.3270. The sandwich was then set 5 cm. below a water-cooled 450 W Hanovia medium pressure mercury lamp. After 10 seconds exposure, $n_D^{23}$=1.3307, after an additional 10 seconds exposure $n_D^{23}$=1.3312, and after an additional 30 seconds exposure $n_D^{23}$=1.3315.

The glass slides were then pried apart to reveal a very clear and flexible film which clung to glass well enough that its refractive index could be measured on the prism of the Abbe refractometer, $n_D^{22}$=1.3317, $n_D^{25}$=1.3312. Calculation of the refractive index from the dispersion reading of the Abbe refractometer gave $n_{807}$=1.3287. Direct critical angle refractive index measurement of the cured polymer film sandwiched between two 45°, 45°, 90° glass prisms was effected on an optical bench with a goniometer and a titanium/sapphire laser tuned to 807 nm, giving $n_{807}$=1.3280.

The photopolymerizable solution was also used to coat an optical fiber having a refractive index of about 1.45, and cured to produce a cladding on the fiber. The resultant cladding had a refractive index of about 1.33 and the clad fiber had a numerical aperture of about 0.59.

I claim:

1. A process for the preparation of a copolymer having pendant photoinitiating groups, this process comprising reacting a photoinitiator monomer having both a photoinitiating group and an ethylenically unsaturated group with a fluorosubstituted monomer having an ethylenically unsaturated group.

2. A process according to claim 1 wherein the fluorosubstituted monomer comprises a monoacrylate or mono-methacrylate.

3. A process according to claim 1 wherein the ethylenically unsaturated group of the photoinitiator monomer is an acrylate or methacrylate group.

4. A copolymer having pendant photoinitiating groups, this copolymer having repeating units from a photoinitiator monomer having both a photoinitiating group and an ethylenically unsaturated group, and repeating units from a fluorosubstituted monomer having an ethylenically unsaturated group.

5. A copolymer according to claim 4 wherein the fluorosubstituted monomer comprises a monoacrylate or monomethacrylate.

6. A copolymer according to claim 5 wherein the fluorosubstituted monoacrylate comprises a fluorosubstituted polyether.

7. A copolymer according to claim 6 wherein the fluorosubstituted monoacrylate comprises

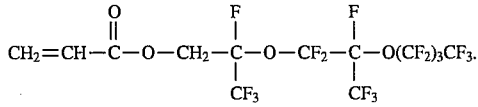

8. A copolymer according to claim 4 wherein the ethylenically unsaturated group of the photoinitiator monomer is an acrylate or methacrylate group.

9. A copolymer according to claim 8 wherein the photoinitiator monomer comprises an acrylate of a phenoxyalkanol or of a phenylalkanol.

10. A copolymer according to claim 9 wherein the photoinitiator monomer comprises

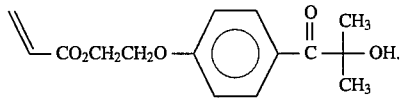

* * * * *